United States Patent
Gosz et al.

(10) Patent No.: US 7,264,459 B2
(45) Date of Patent: Sep. 4, 2007

(54) DEVICE FOR KEEPING A MOLD PLATE SQUARE, PERPENDICULAR AND DRIVING FOR A FOOD PRODUCT MOLDING MACHINE

(75) Inventors: Rick G. Gosz, Oshkosh, WI (US); Mark A. Kubsh, Francis Creek, WI (US)

(73) Assignee: Patriot Universal Holdings, LLC., Hilbert, WI (US)

( * ) Notice: Subject to any disclaimer, the term of this patent is extended or adjusted under 35 U.S.C. 154(b) by 0 days.

(21) Appl. No.: 10/977,878

(22) Filed: Oct. 28, 2004

(65) Prior Publication Data

US 2005/0106282 A1    May 19, 2005

Related U.S. Application Data

(60) Provisional application No. 60/515,206, filed on Oct. 28, 2003, provisional application No. 60/515,045, filed on Oct. 28, 2003, provisional application No. 60/515,034, filed on Oct. 25, 2003.

(51) Int. Cl.
*B29C 45/17* (2006.01)
*A22C 7/00* (2006.01)
*A23G 3/02* (2006.01)

(52) U.S. Cl. .................. 425/192 R; 426/512; 426/513
(58) Field of Classification Search ............ 425/192 R, 425/436 RM, 444, 572, 513; 426/512; 452/174
See application file for complete search history.

(56) References Cited

U.S. PATENT DOCUMENTS

| | | | | | |
|---|---|---|---|---|---|
| 3,241,178 | A | * | 3/1966 | Bridge, Jr. .................. | 425/556 |
| 3,909,880 | A | * | 10/1975 | Holly ......................... | 425/556 |
| 4,054,967 | A | * | 10/1977 | Sandberg et al. ........... | 426/512 |
| 4,153,974 | A | * | 5/1979 | Holly et al. ................ | 425/556 |
| 4,996,743 | A | * | 3/1991 | Janssen ...................... | 425/236 |
| 5,730,650 | A | * | 3/1998 | Soper ......................... | 452/174 |
| 6,827,111 | B1 | * | 12/2004 | Tournour et al. ............ | 141/12 |

* cited by examiner

*Primary Examiner*—Yogendra N. Gupta
*Assistant Examiner*—Emmanuel S. Luk
(74) *Attorney, Agent, or Firm*—Philip M. Weiss; Weiss & Weiss

(57) ABSTRACT

A belt drive system for a reciprocating mold plate in a food product molding machine. The invention relates to a belt drive system having a belt tensioning device configured to tension a drive belt of an indexing motion food product molding machine. The invention provides ease of service and/or replacement of components of the drive system. The invention provides a manifold configuration to balance the flow and pressure of the food product over a wide fill area.

1 Claim, 12 Drawing Sheets

FIG. 11
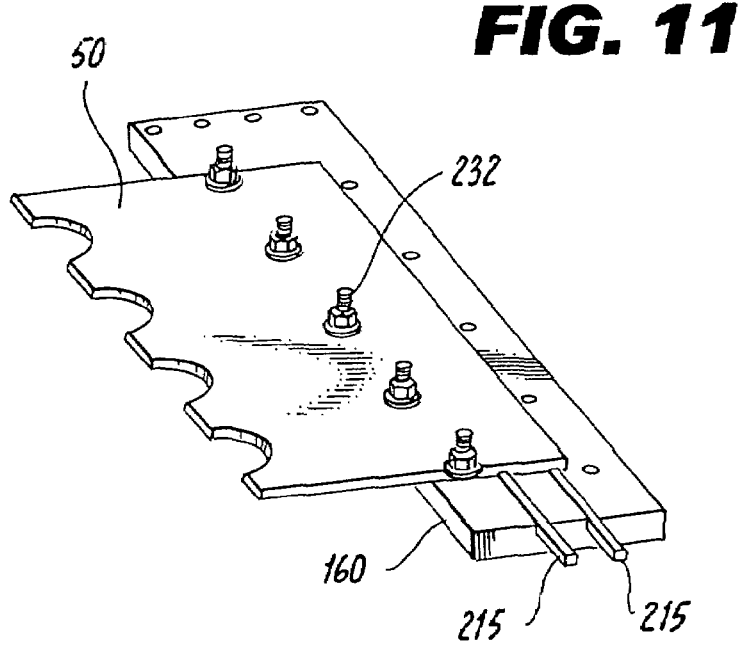
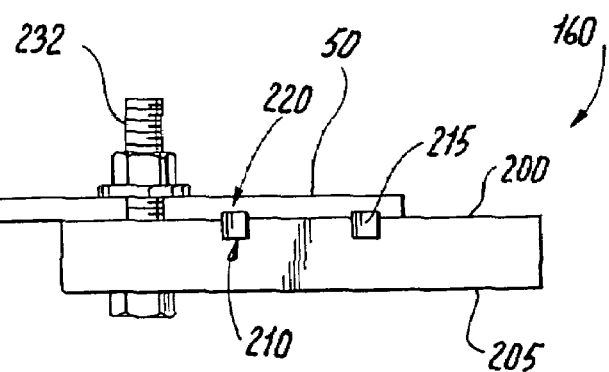
FIG. 12

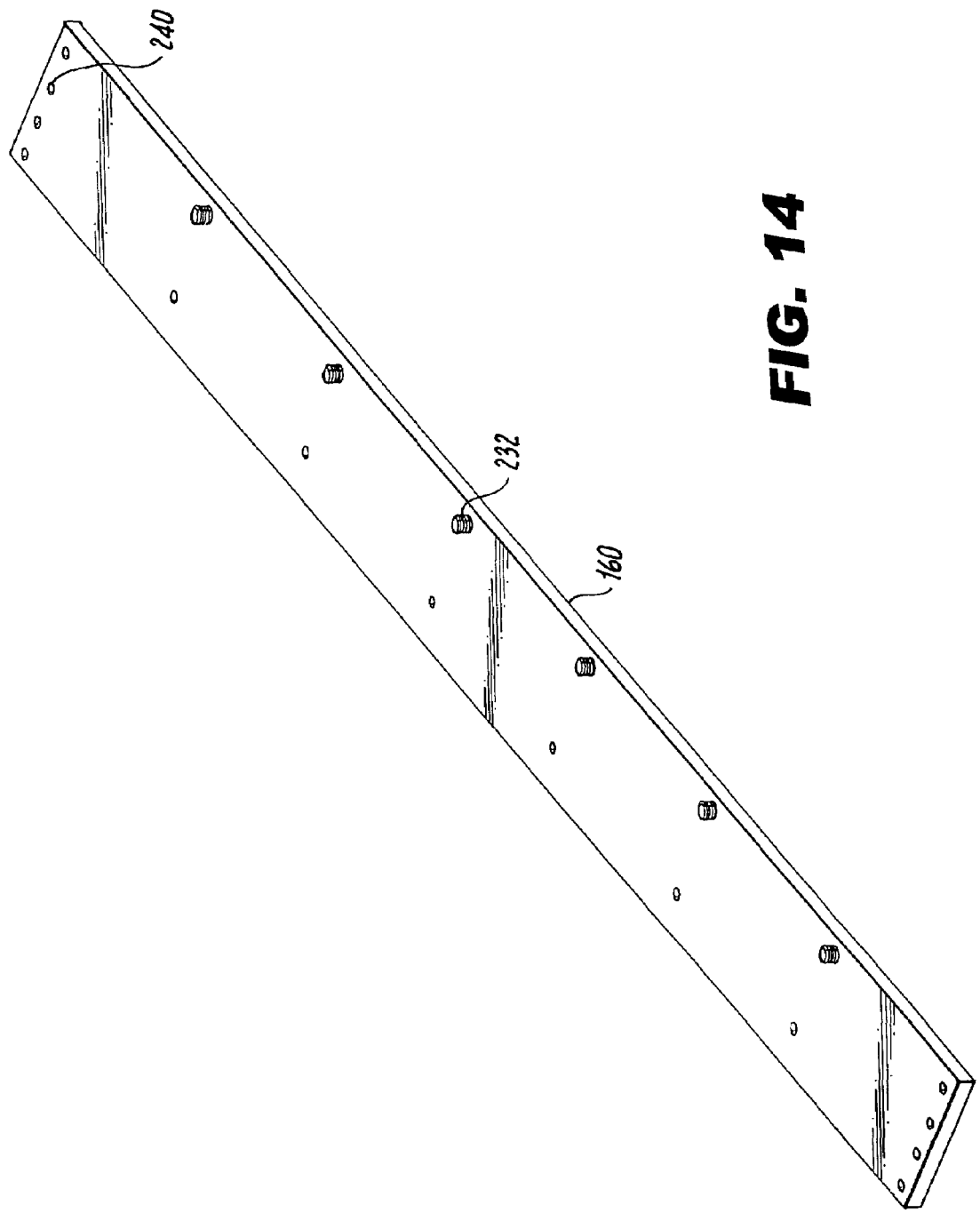

DEVICE FOR KEEPING A MOLD PLATE SQUARE, PERPENDICULAR AND DRIVING FOR A FOOD PRODUCT MOLDING MACHINE

RELATED APPLICATIONS

The present application claims priority to provisional patent applications Ser. Nos. 60/515,034, 60/515,045 and 60/515,206 filed Oct. 28, 2003.

FIELD OF THE INVENTION

This invention relates generally to a belt drive system for a food product molding machine. The invention provides ease of service and/or replacement of components of the drive system. The invention provides a belt tensioning device configured to tension a drive belt of an indexing motion food product molding machine. The invention provides a manifold configuration to balance the flow and pressure of the food product over a wide fill area.

BACKGROUND OF THE INVENTION

Before automation, consumers generally formed patties of food product by hand. However, demand (e.g., the fast-food industry) for high-speed and high-volume production of food products led to the development of automated machines configured to provide molded food product. Generally, such machines mold the food product under pressure into patties of various shapes and sizes. A typical application for food product molding machines is in the production of hamburger patties. Yet, the type of food product (e.g., vegetables, meat, fish, etc.) and shape (e.g., rods, patties, etc.) can vary. The molded food products are distributed to restaurants, grocery stores, etc. The demand for high volume, high-speed food product molding machinery continues to grow.

However, prior art food product molding machines have several drawbacks. For example, known molding machine use hydraulic or mechanical crank systems to reciprocate the lateral back and forth motion of a mold plate from a fill position to a patty discharge position. These hydraulic and mechanical crank systems are cumbersome to install and maintain, and have a limited speed of operation.

Further for example, with regard to a mold plate drive assembly and connected linkage which drives reciprocation of a mold plate between a fill position and a patty discharge position, the linkage is attached to the mold plate by only a few bolt fasteners that can slip or loosen over an extended operation.

As can be seen, the present state of the art of drive systems incorporated into food product molding machines has definite shortcomings. Further, the state of the art of mold drive assemblies and mold plate connections in food product molding machines has shortcomings.

SUMMARY OF THE INVENTION

In accordance with the present invention, there is provided a belt drive assembly for a mold plate, comprising a mold plate having a plurality of cavities configured to receive a food product and a mold plate drive assembly coupled to the mold plate. The drive belt rotates in a clockwise and a counterclockwise direction to cause reciprocating movement of the mold plate.

There is provided a method of driving a mold plate of a food product molding machine between a fill position and a discharge position, the method comprising the acts of operating a motor to rotate a first drive pulley in a first rotational direction; driving a second drive pulley with the first drive pulley to cause a mold plate to slide in a first direction toward a fill position; operating the motor to rotate the first drive pulley in a second direction; driving the second drive pulley with the first drive pulley to cause the mold plate to slide in a second direction toward a discharge position; and repeating the acts of rotating the first drive pulley in the first and second rotational directions to cause cyclic reciprocation of the mold plate between the fill and the discharge positions.

The present invention further relates to a food product molding machine that includes a mold plate having a plurality of cavities configured to receive a food product; and a mold plate drive assembly coupled to first belt drive cartridge assembly and a second belt drive cartridge assembly, each of which is coupled to one side of the machine. The mold plate drive assembly is configured to drive linear motion of the first and second belt cartridge assemblies, to drive the mold plate between a fill position and a discharge position.

The present invention relates to a food product molding machine comprising a hopper configured to receive a food product, a plunger assemblies, and an auger assembly configured to supply the food product from the hopper to the pump assembly. The machine further includes a feed chamber/manifold assembly configured to communicate food product under pressure from the pump assembly to a mold plate having a plurality of cavities. The machine further includes a mold plate drive assembly having a first belt drive cartridge assembly and a second belt drive cartridge assembly disposed on each side of the machine that are configured to drive the mold plate in a linear motion. The first and second belt drive cartridges are configured to be quickly and easily installed in and removed from the machine.

The present invention relates to a food product molding machine comprising a mold plate and a mold plate drive assembly operable to reciprocate the mold plate between a fill position and a discharge position. The machine further includes a drawbar interconnecting the mold plate drive assembly and the mold plate, the drawbar and the mold plate including a keyway aligned to receive a key stock interconnecting the drawbar and the mold plate.

BRIEF DESCRIPTION OF THE DRAWINGS

FIG. 11 is a detailed perspective view of the mold plate and drawbar in FIG. 10.

FIG. 12 is a detailed side elevation view of the mold plate and drawbar in FIG. 11.

FIG. 14 is a detailed bottom view of the drawbar in FIG. 1.

DETAILED DESCRIPTION OF THE PREFERRED EMBODIMENTS

The present invention relates to a food product molding machine having a mold plate drive system that includes a mold plate drive belt assembly. The present invention relates to a drawbar configured to move a mold plate in a reciprocating cycle in a food product molding machine.

Figure 1:
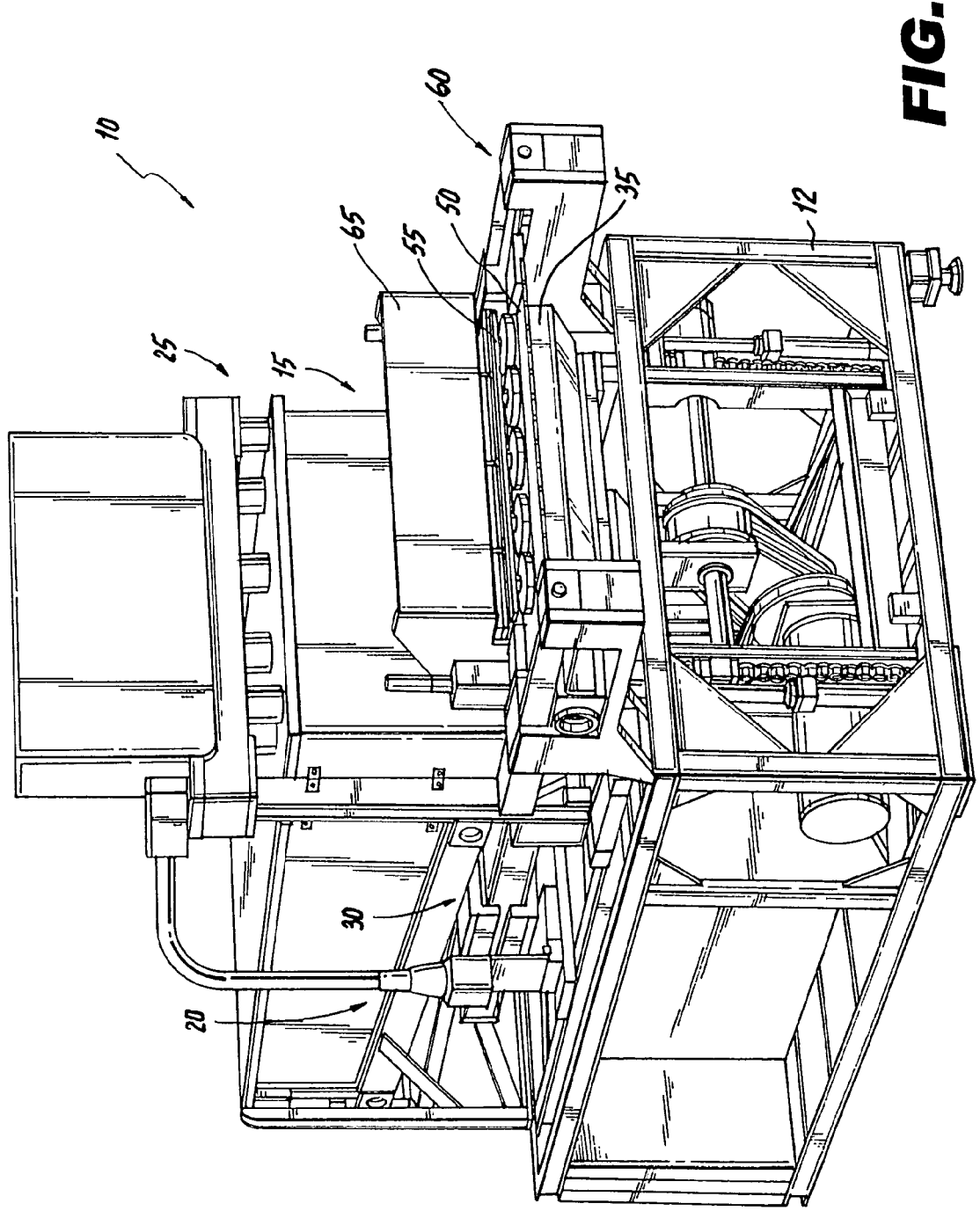
FIG. 1 is a perspective view of one embodiment of a food product molding machine in accordance with the present invention.
Figure 2:
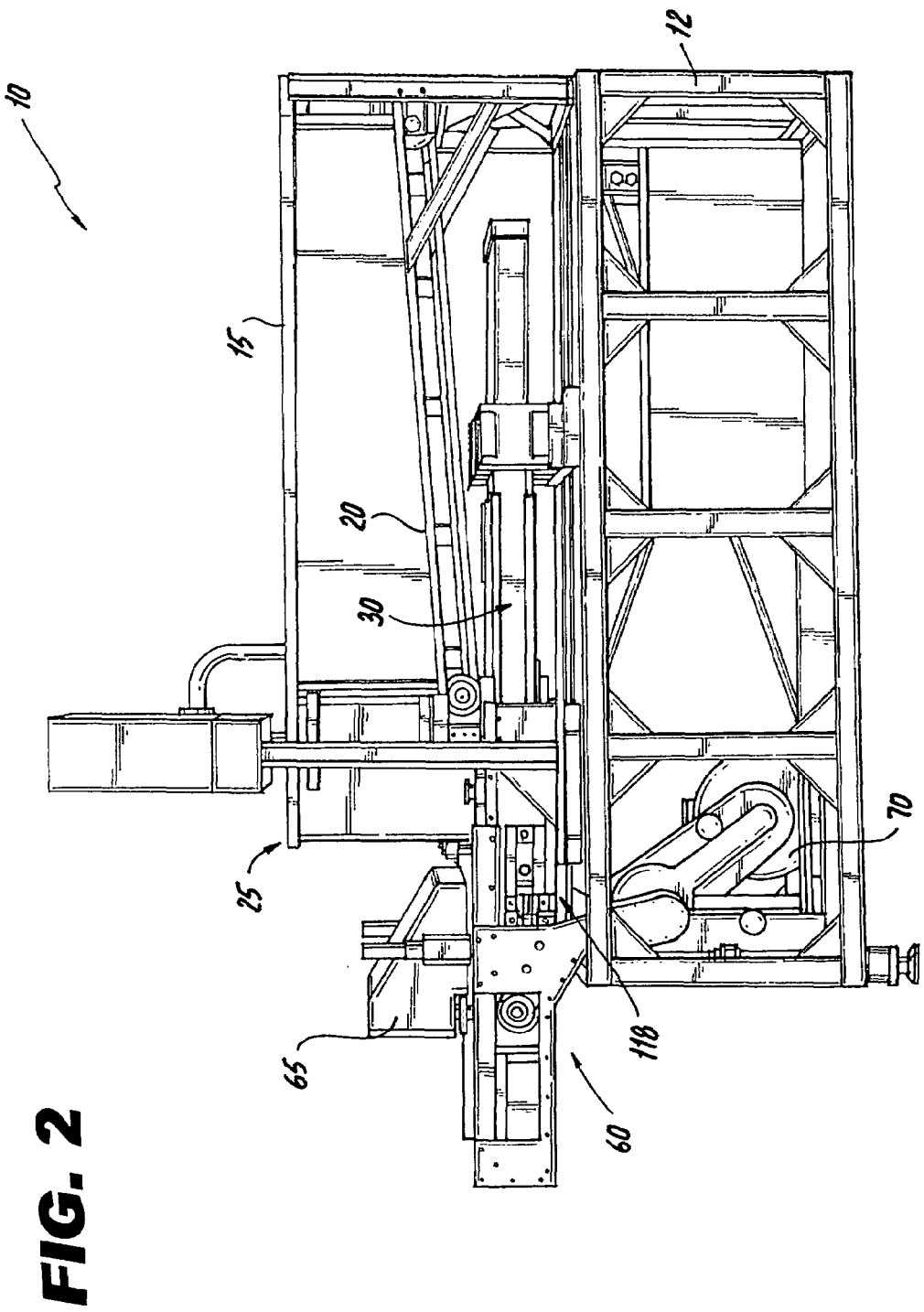
FIG. 2 is a side elevation view of the food product molding machine shown in FIG. 1.

FIGS. 1 and 2 show one embodiment of the food product molding machine 10 of the present invention. The machine 10 generally includes a frame 12 that supports a food hopper 15 and conveyor assembly 20 configured to deliver a supply of food product to an auger assembly 25. The auger assembly 25 regulates the supply of the food product to a pump system. The pump system includes a series of plunger assemblies 30 configured to pressurize or force the food product through a feed chamber/manifold assembly 35 and into a series of cavities in a mold plate 50. The pressure applied by the plunger assemblies 30 regulates the compression of the food product in the cavities of the mold plate 50. A knockout assembly 55 separates the formed food product or patty from the reciprocating mold plate 50 driven by a mold plate drive assembly 60.

A mold plate drive belt system 60 reciprocates the mold plate 50 between a fill position and a discharge position. At the fill position, the mold drive system 60 moves the mold plate 50 in alignment over a fill area of a fill plate that overlies feed chamber/manifold assembly 35 to receive the pressurized food product into the plurality of cavities in the mold plate 50. A mold cover and a breather plate enclose the cavity of the mold plate 50 when the mold plate 50 is positioned over the fill area in the fill position. After filling the cavities of the mold plate 50 with food product fed under pressure from the feed chamber/manifold assembly 35, the mold drive system 60 slides the mold plate 50 outward from alignment with the fill area toward the discharge position. At the discharge position, a knockout assembly 55 separates the one or more formed food product patties from the mold plate 50, typically depositing the formed patties onto an underlying conveyor.

Figure 3:
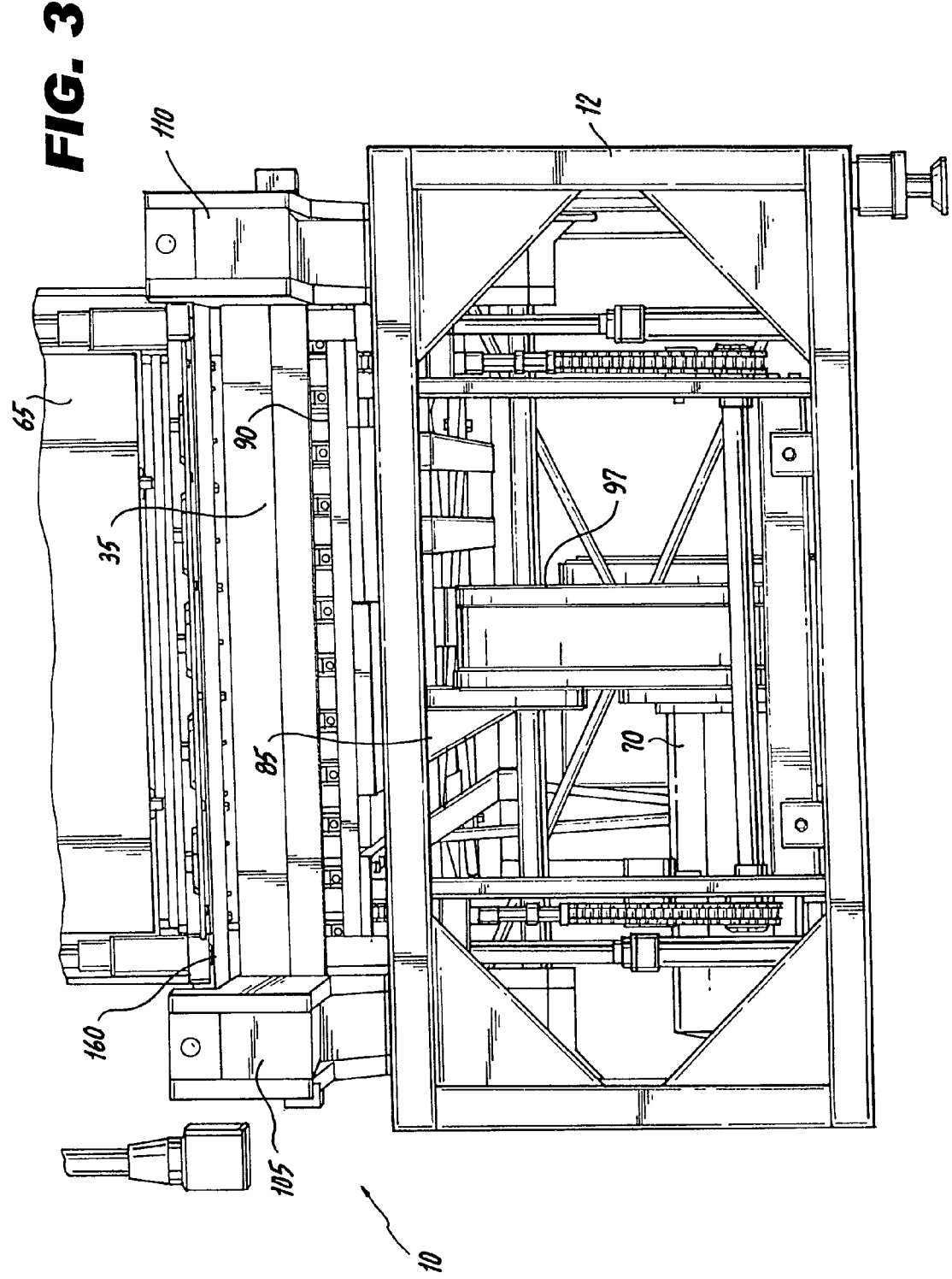
FIG. 3 is a detailed front view of a mold plate drive belt assembly shown in FIG. 1.
Figure 4:
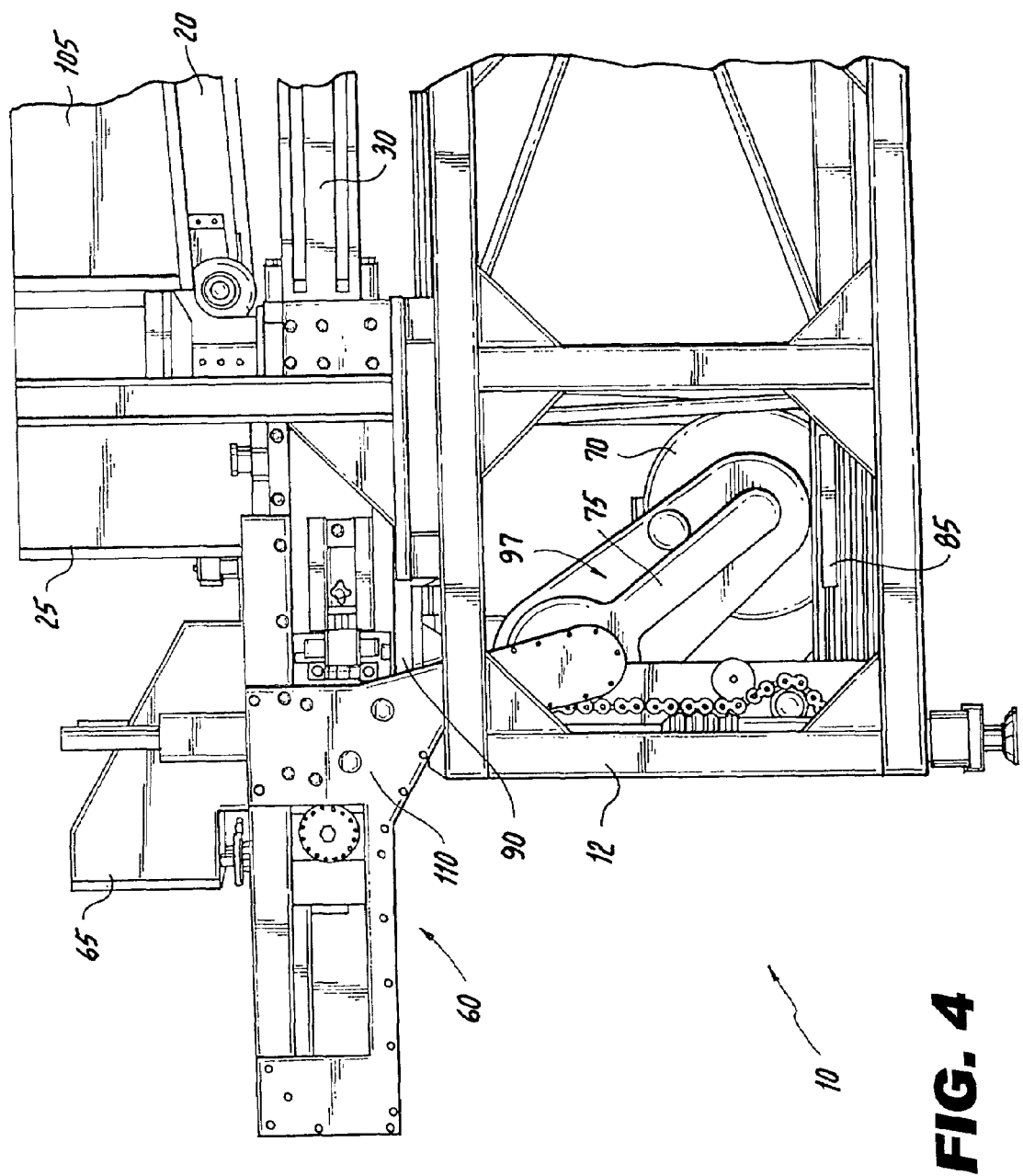
FIG. 4 is a detailed side elevation view of a mold plate drive belt assembly shown in FIG. 1.
Figure 5:
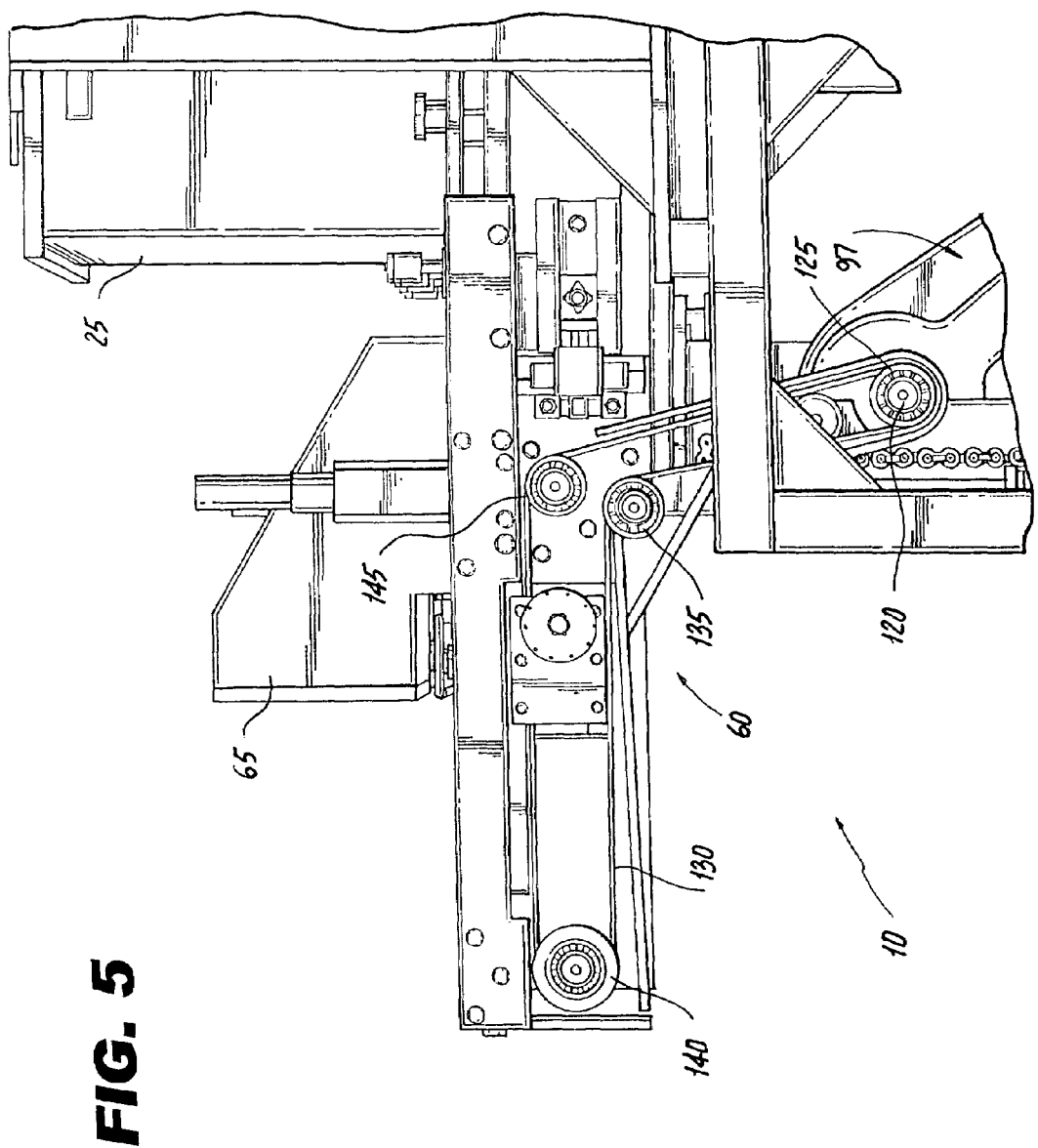
FIG. 5 is a detailed side view of the mold plate drive belt assembly in FIG. 1 with a side housing panel removed.
Figure 6:
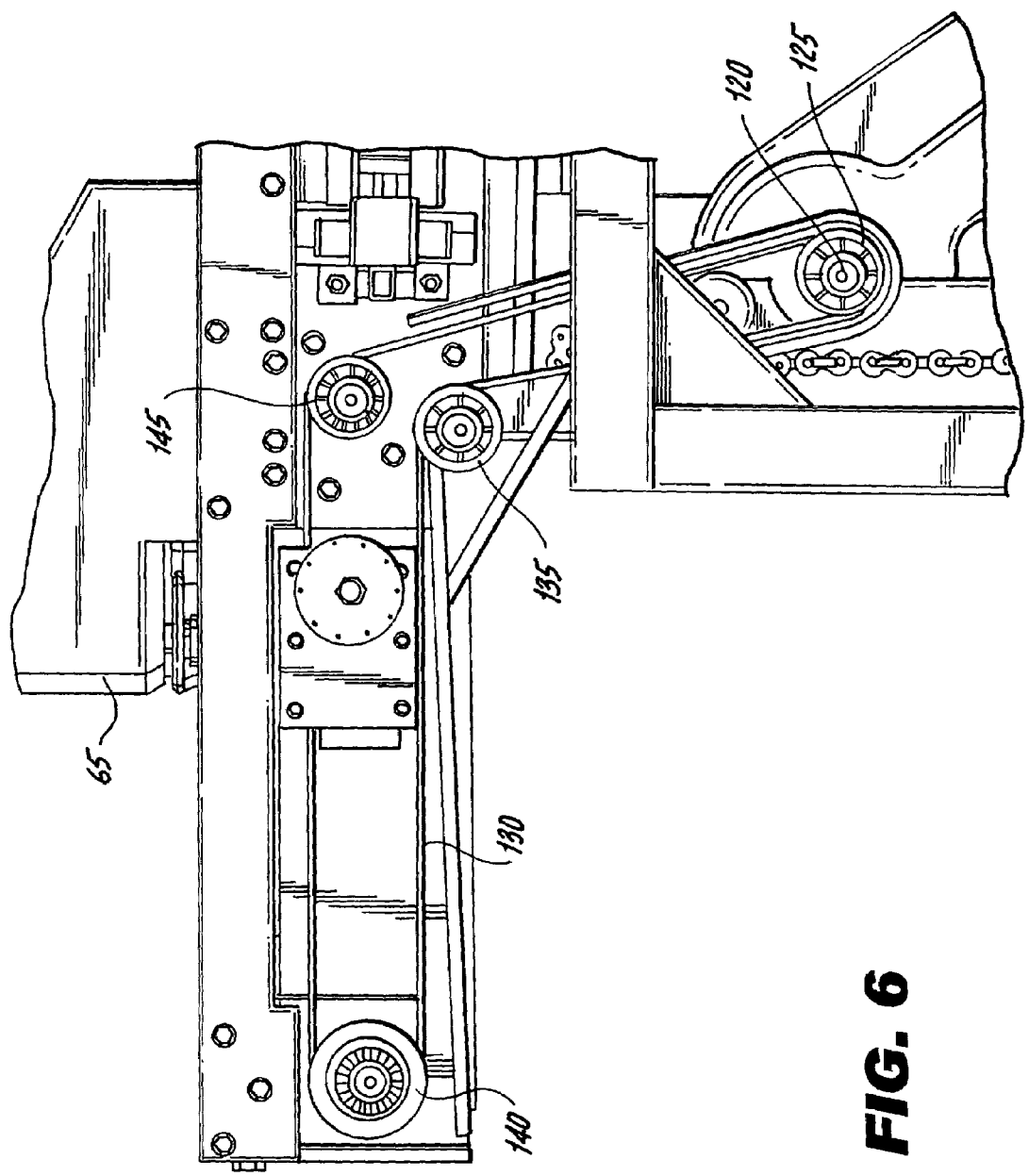
FIG. 6 is a detailed side view of the mold plate drive belt assembly in FIG. 5.
Figure 7:
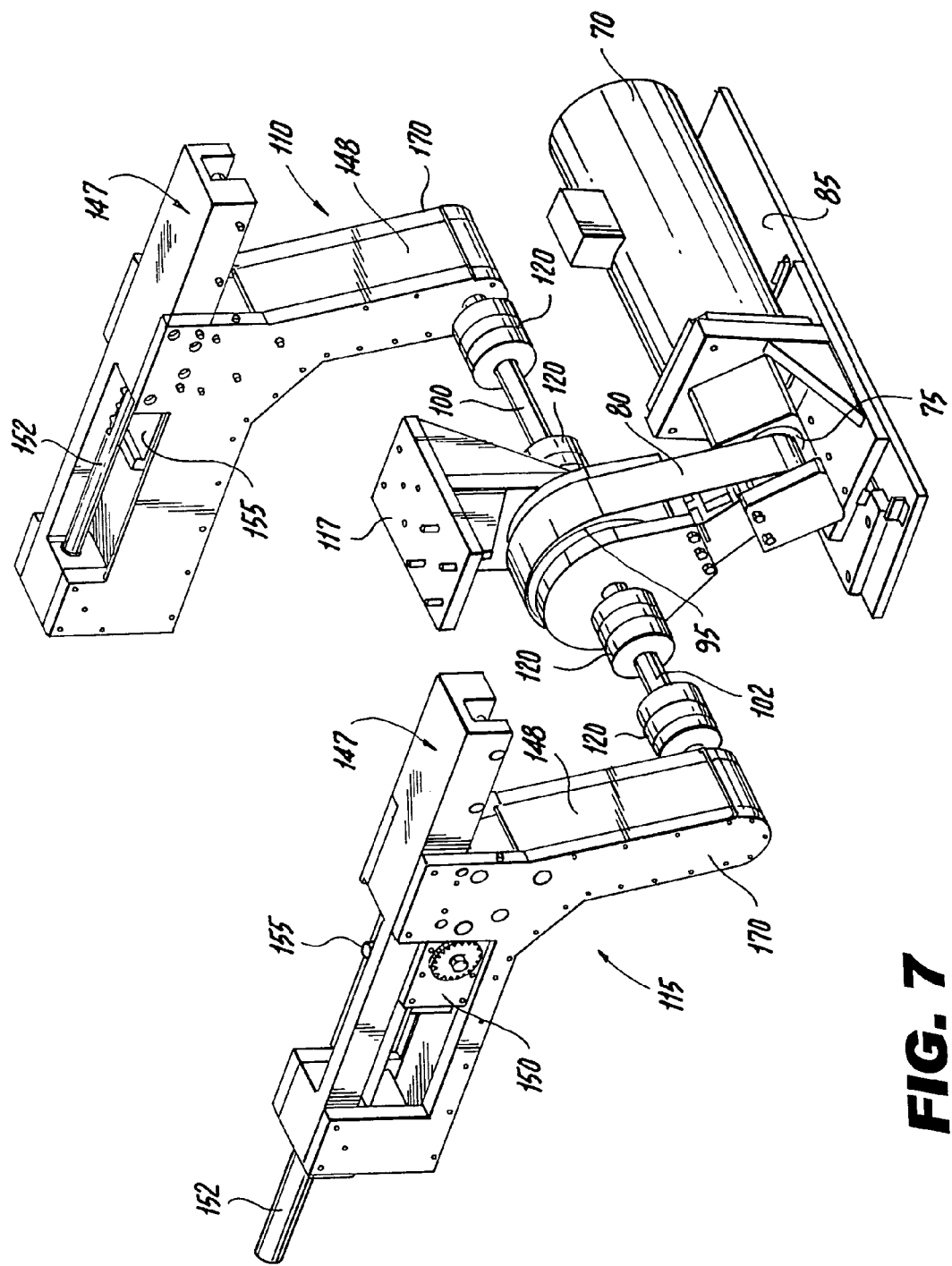
FIG. 7 is a perspective of the mold plate drive assembly removed from the machine shown in FIG. 1.
Figure 8:
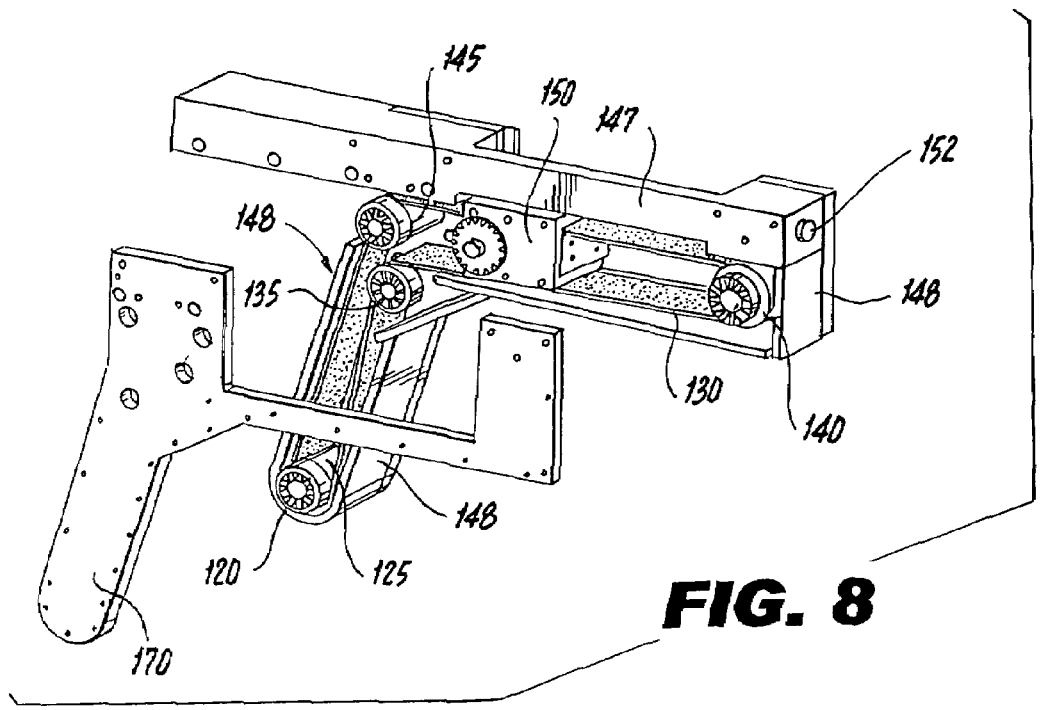
FIG. 8 is a detailed perspective view of a drive cartridge assembly and removable panel of the drive assembly in FIG. 7.
Figure 9:
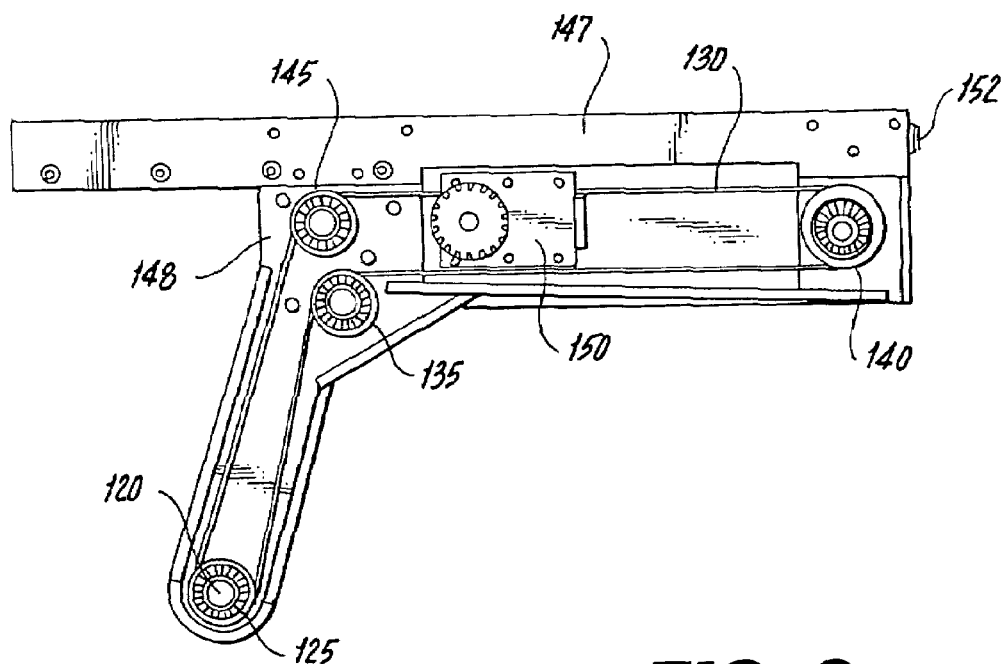
FIG. 9 is a detailed side elevation view of the drive cartridge assembly in FIG. 7 with the removable panel removed.

FIGS. 3 and 4 show a detailed front and side view, respectively, of the mold plate drive assembly 60 of the machine 10 of FIG. 1. The mold plate drive assembly 60 includes a motor 70 that is coupled to a drive pulley 75 configured to drive rotation of a drive belt 80. The motor 70 is preferably of a servo motor configured to receive control signals from a controller. Based on the control signals from the controller, the servo motor 70 drives the cyclic reciprocation of the mold plate 50 between the fill position and the discharge position. The motor 70 and the drive pulley 75 are centrally disposed underneath the feed chamber assembly/manifold assembly 35 for ready access for maintenance or repair. The motor 70 is coupled by a mounting bracket 85 to the frame 12 of the machine 10 by a plurality of fasteners (e.g., bolts, screws, welds, etc.). The type of a drive belt 80 can vary.

The drive pulley 75 drives rotation of a driven pulley 95 via the drive belt 80. A belt guard 97 encloses the drive belt 80. The driven pulley 95 is coupled to one end of a first shaft 100 and one end of a second shaft 102 extending laterally toward opposite sides of the machine 10. The other end of the first shaft 100 is coupled to a first drive cartridge 110 disposed on one side of the machine 10. The other end of the second shaft 102 is coupled to a second drive cartridge 115 disposed on the opposite side of the machine 10. Each shaft 100 and 102 includes a series of couplers 120 configured to couple each shaft 100 and 102 to the drive cartridges 110 and 115 and to the driven pulley 95. The driven pulley 95 and coupled shafts 100 and 102 are supported by a mounting bracket 117 coupled by fasteners to a main assembly plate 118 that is fixedly attached to the frame 12 of the machine 10.

As shown in FIGS. 5, 6, 8 and 9, drive cartridges 110 and 115 are coupled to drive shafts 100 and 102, respectively, via couplers 120. The drive pulley 125 is configured to rotationally drive a drive belt 130 of each drive cartridge 110 and 115. Each drive cartridge 110 and 115 includes a drive belt 130 that wraps around a series of idler pulleys 135, 140 and 145 and the drive pulley 125. The idler pulleys 135, 140, and 145 redirect the rotational drive of the mold plate drive assembly at the drive pulley 125 into lateral motion of the mold plate 50 between a fill position and a discharge position. The number and type of idler pulleys 135, 140 and 145 can vary.

Each drive cartridge 110 and 115 includes a first arm 147 coupled by fasteners to a spacer plates 148 to support the assembly of the drive cartridges 110 and 115 described above. The arm 147 includes openings to couple each drive cartridge 110 and 115 with fasteners to the feed chamber/manifold assembly 35. The arm 147 generally extends axially in a direction generally parallel to the direction of the travel of the mold plate 50.

The ends of the drive belt 130 of each drive cartridge 110 and 115 are coupled by a belt tensioner assembly 150. The belt tensioner assembly 150 provides tensional force on the belt 130 to hold the belt 130 along the series of idler pulleys 135, 140 and 145 and the drive pulley 125. The belt tensioner assembly 150 of the invention is configured to provide tensioning of the drive belt 130 accurately and quickly.

The belt tensioner assembly 150 of each drive cartridge 110 and 115 is coupled to a guide rod 152. The guide rod 152 rides in linear bushings of the arm 147 and guides the linear motion of the belt tensioner assembly 150. The cross-sectional shape (e.g., square, circular, etc.) of the guide rod 152 can vary. The guide rod 152 is coupled to a drawbar guide 155. The drawbar guide 155 is configured to couple with a drawbar 160 disposed laterally between the first 110 and the second 115 drive cartridges. The drawbar 160 is coupled to the mold plate 50.

Each drive cartridge 110 and 115 includes a housing having a removable panel 170 for ready access to the drive cartridge assemblies 110 and 115. The drive cartridges 110 and 115 are coupled to the feed chamber/manifold assembly 35 by a series of fasteners through removable panel 170 and openings in arm 147. The drive cartridges 110 and 115 are disposed on the sides of the machine 10 and configured to be readily removed as an assembly from machine 10 for subsequent disassembly and maintenance.

In operation, the drive belt 130 in each drive cartridge 110 and 115 is tensioned around the idler pulleys 135, 140, and 145 and the drive pulley 125 by the belt tensioner 150. A controller (not shown) for the mold plate drive assembly 60 receives signals representative of the position of the mold plate 50. The controller can be configured to receive various signals from pressure sensors, proximity switches, etc. representative of the pressure of the food product forced in the cavity of the mold plate 50 or the position of the mold plate 50. The controller provides control signals to the motor 70 to control the directional drive of the pulley 75. Initially, the motor 70 drives rotation of the drive pulley 75 and attached drive belt 80, drive shafts 100 and 102, and drive pulleys 120 in each drive cartridge 110 and 115 in a first rotational direction to cause the drive belt 130 to move the belt tensioner 150, guide rod 152, drawbar guide 155, drawbar 160, and mold plate 50 to move in a first linear direction toward the fill position of the fill plate. Upon filling of the mold plate cavities with food product to the designated pressure and/or for the designated dwell time, the controller signals the motor 70 to change direction. The motor 70 rotates the drive pulley 75 and attached drive belt 80, drive shafts 100 and 102, and drive pulleys 125 in a similar fashion to cause the drive belt 130 to move the belt tensioner 150, guide rod 152, drawbar guide 155, drawbar 160 of each drive cartridge 110 and 115 in a second linear direction such that the mold plate 50 slides away from the fill position and toward a discharge position at the knockout assembly 55. The knockout assembly 55 discharges or releases the formed food product patties from the cavities of the mold plate 50. Thereby, the mold plate drive assembly 60 drives cyclic reciprocation of the mold plate 50 between the fill position and the discharge position as described above.

Figure 10:
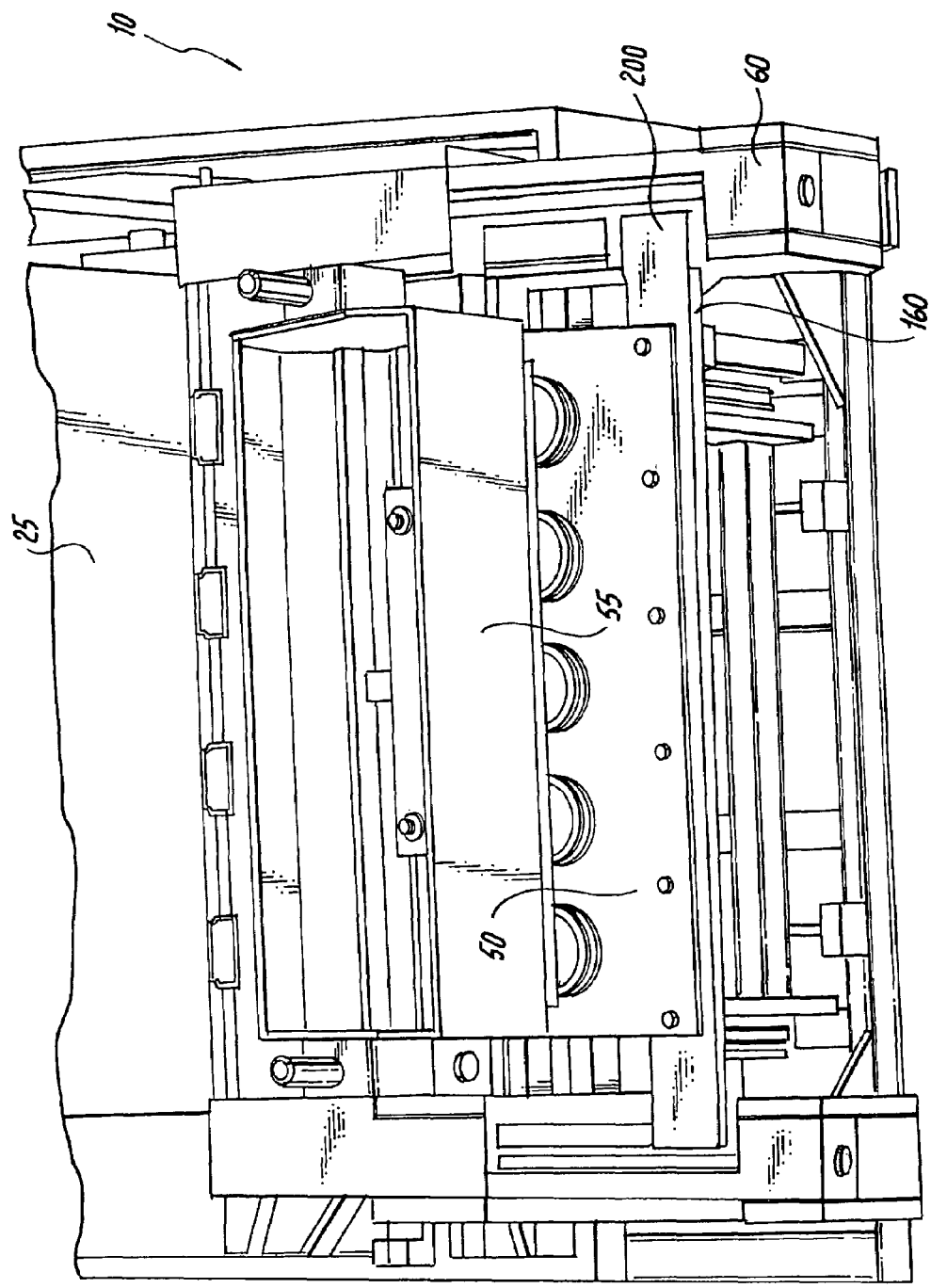
FIG. 10 is a detailed perspective view of the mold plate, mold plate belt drive mechanism and the drawbar shown in FIG. 1.
Figure 13:
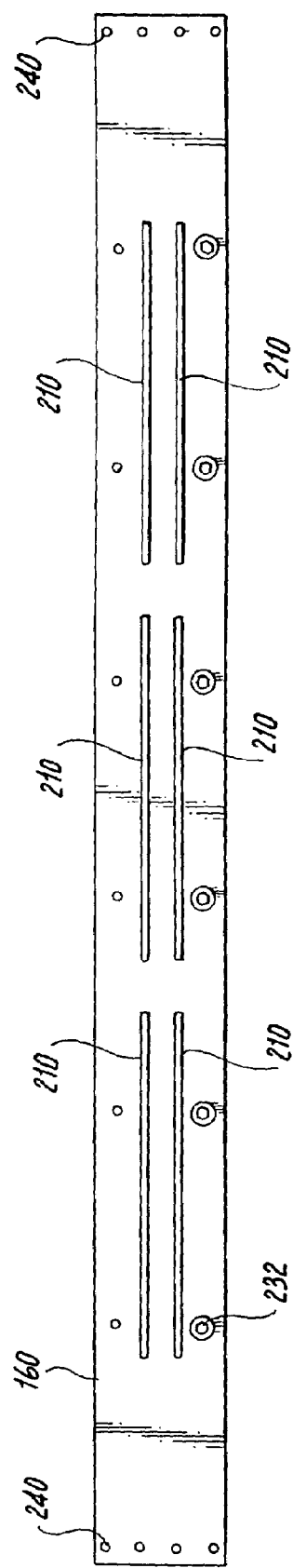
FIG. 13 is a detailed top view of the drawbar in FIG. 1.

Referring to FIG. 10, a mold plate drive system 60 is coupled to a drawbar 160 that reciprocates the mold plate 50 back and forth in alignment with a fill area of the fill plate to receive the pressurized food product from the plunger assemblies. After filling the cavities, the mold plate drive system 60 slides the mold plate 50 outward from alignment with the fill area, where the knockout assembly 55 discharges the molded food product from the cavity of the mold plate 50, typically onto an underlying conveyor. The type of mold plate drive assembly 60 (e.g., mechanical linkage, hydraulic, belt drive system, etc.) can vary.

FIGS. 11 and 12 show detailed views of the drawbar 160 coupled to the mold plate 50. The drawbar 160 is generally planar and includes a top face 200 and lower face 205. The top face 200 includes a plurality of keyways or slots 210 extending longitudinally along the length of the drawbar 160. Each keyway 210 is configured to receive a key stock 215 extending at least the length of the keyway 210. The key stock 215 is sized such that a portion extends above the top face 200 of the drawbar 160. In the embodiment shown, the number of keyways 210 and key stocks 215 is two. The number and size of the keyways 210 and key stocks 215 can vary. The composition of the drawbar 160 and key stocks 215 can include any material known by those in the art for use in food processing machinery. The key can be machined from the drawbar solid stock and be made in one piece rather than separate pieces as described above.

The mold plate 50 includes a plurality of keyways 220 in its underside, which are configured to align with the keyways 210 of the drawbar 160 and receive the extended portion of the interposed key stock 215. The mold plate 50 and drawbar 160 further include a plurality of openings 230 aligned to receive fasteners 232 coupling the drawbar 160 to the mold plate 50. The number and types of fasteners (e.g., screws, bots and nuts, etc.) can vary. The drawbar 160 is coupled to the mold plate drive assembly 60 by a plurality of fasteners inserted through openings 240 similar to those coupling the mold plate 50 and the drawbar 160. The drive assembly 60 is operable to reciprocate the drawbar 160 and attached mold plate 50 between the fill position and the discharge position.

As shown in FIGS. 11 and 12, the portion of the key stock 215 received in the keyway 210 of the drawbar 160 is greater than the remaining portion of key stock 215 received by the keyway 220 in the mold plate 50. The portion of the key stock 215 in the drawbar keyway 210 and the mold plate keyway 220 can vary.

Many variations of the invention can be made without departing from the spirit and scope of the invention.

We claim:
1. A food product molding machine comprising:
a mold plate;
a mold plate drive assembly operable to reciprocate said mold plate between a fill position and a discharge position;
a drawbar interconnecting said mold plate drive assembly and said mold plate, said drawbar and said mold plate including aligned keyways adapted to receive a key member for interconnecting said drawbar and said mold plate.

* * * * *